United States Patent
Ford et al.

(10) Patent No.: US 6,374,299 B1
(45) Date of Patent: *Apr. 16, 2002

(54) ENHANCED SCALABLE DISTRIBUTED NETWORK CONTROLLER

(75) Inventors: Christopher Ford, Princeton Jct; Mahadevan Lakshmanan, Voorhees; Robert Scott Scalf, Mount Holly, all of NJ (US)

(73) Assignee: Merrill Lynch & Co. Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/491,815

(22) Filed: Jan. 26, 2000

Related U.S. Application Data

(63) Continuation of application No. 09/019,233, filed on Feb. 5, 1998, now Pat. No. 6,047,324.

(51) Int. Cl.[7] .............................................. G06F 15/10
(52) U.S. Cl. ........................................ 709/227; 709/230
(58) Field of Search ................................ 709/300, 302, 709/304, 227, 230; 707/1, 10

(56) References Cited

U.S. PATENT DOCUMENTS

| 5,768,510 A | | 6/1998 | Gish |
| 6,047,324 A | * | 4/2000 | Ford et al. ................. 709/227 |

* cited by examiner

*Primary Examiner*—Dung C. Dinh
(74) *Attorney, Agent, or Firm*—Morgan, Lewis & Bockius

(57) ABSTRACT

A data processing architecture provides a common grouping of code that supports a diverse set of services and allows substantially seamless access to these services by subscribers. The architecture is supported by several interrelated components. A framework mechanism provides conforming dynamically linked libraries specific to a given service. System operation is enhanced by a routing mechanism that allocates service loading in accordance with demand and availability. Because a common code framework characterizes much of the complex communication coding, developers seeking to implement new services can concentrate on creating service functionality and rely on the framework mechanism for communication and navigation support.

24 Claims, 14 Drawing Sheets

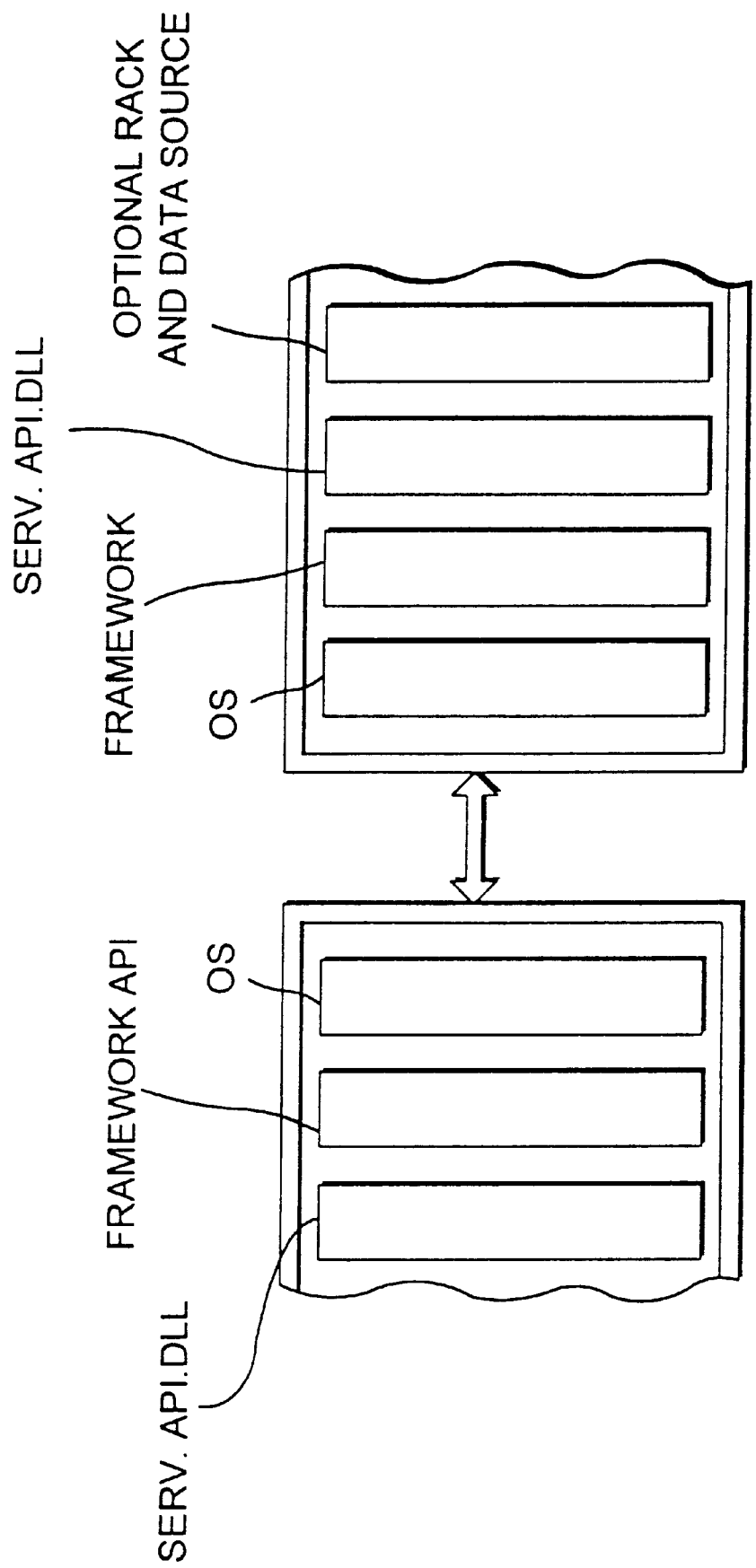
F I G. 4

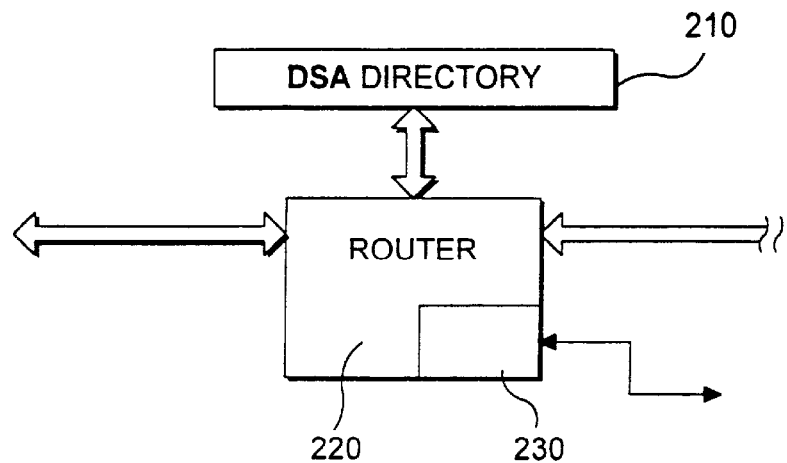
F I G. 5
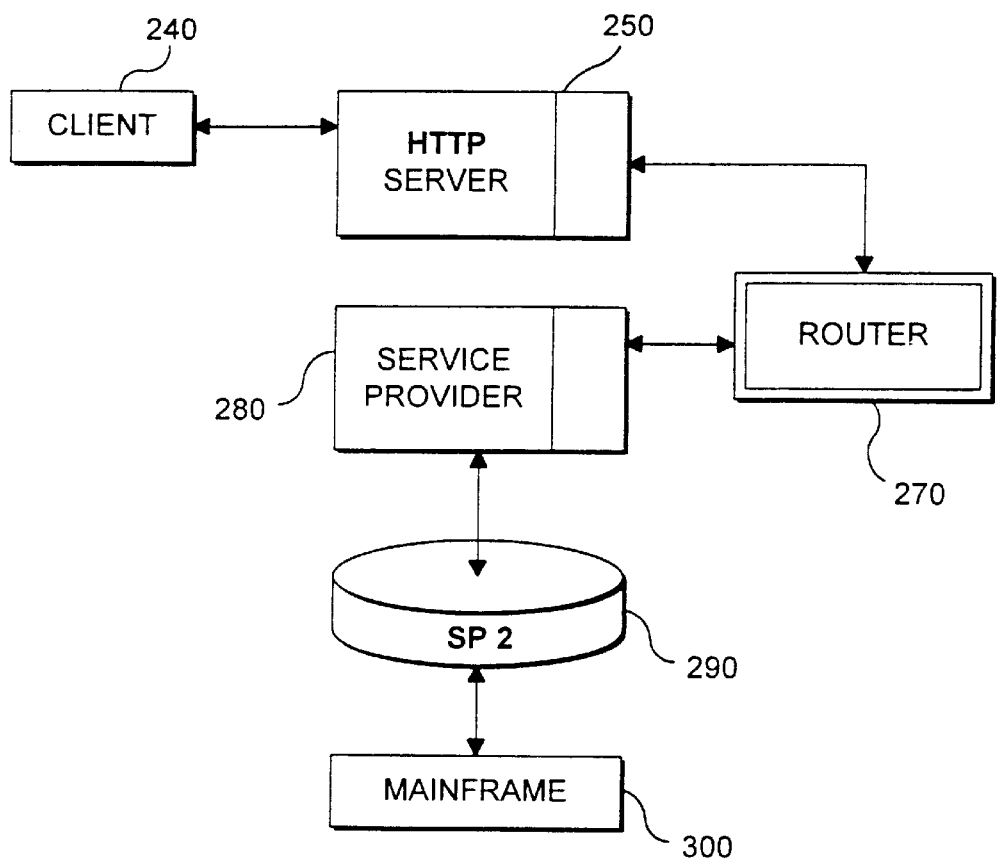
F I G. 6

ENHANCED SCALABLE DISTRIBUTED NETWORK CONTROLLER

This application is a continuation of Ser. No. 09/019,233 filed Feb. 5, 1998, U.S. Pat. No. 6,047,324.

FIELD OF THE INVENTION

The present invention generally relates to data processing systems and program controls for managing discrete service support and implementation. More specifically, the present invention is directed to a new sophisticated application service and client-server architecture for managing the access and communication across a plurality of interconnected computers including network servers and mainframes, with data and application access via a public network such as the Internet.

BACKGROUND OF THE INVENTION

The recent and explosive growth of online communications using computers to link into vast networks has dramatically changed the landscape as it relates to the way certain firms do business. Traditional modes of distributing information to employees and customers are being displaced with the new paradigm created by remote computer links to networks for a full spectrum of information services. Customers are now able to access account information and projections, salesmen access updated news and customer reports, and management communicates to staff and vendors in a simplified and uniform manner using the Internet and now well established browser technology.

This growth in the new applications of online communications has placed new demands on existing computer systems operated by the business and service organizations attempting to take advantage of online service access. Smaller companies have mostly farmed out their new online data demands to Internet service providers (ISPs), that provide a narrow set of online data distribution tools and capabilities. This, however, is not a solution for larger, integrated service firms as their current and future demands for data processing and distribution across linked networks and the Internet require sophisticated systems that include the ability to expand in a seamless and relatively painless manner.

This is particularly true for large financial service companies. These firms provide a full spectrum of diverse financial services to a broad group of clients, both national and international, with regional offices spread throughout the country and in most major international markets. Existing computer systems include large and powerful mainframe computers with strong centralized data processing capabilities, and in conjunction with these mainframes, one or more networks (LAN and/or WAN structures) linking together rings of PC-based workstations.

These existing computer systems have evolved over the years with the newer software systems integrated within the legacy software applications. Accordingly, present computer systems include older programs and databases intermixed with more recent software systems, such as computer networks. Applications, data, and capabilities are thus spread amongst these various hardware systems each of which involves a level of independent operation and has a unique interface.

This environment has created a variety of problems in attempting to implement the above-noted online capabilities for system wide access. Programmers developing new services linking to a home page or the like must provide all the programming to effect the service and navigate the intricacies of the network environment.

To expedite the programming of new services that are able to take advantage of Internet based communications, a common architecture that provides the requisite communication protocols for network implementation would substantially reduce the amount of time and effort required to build new applications and services. A common architecture provides the appropriate interface structures for allowing different programs to communicate with each other and pass data therebetween.

Efforts to develop a common architecture that allows the free flow of data and permits seamless communication and scaling have met with mixed results. Products exist that provide some of the above functionality, such as DCE (distributed computing environment), CORBA (common object request broker architecture), and DCOM (distributed common object module). These systems provide meaningful advance but suffer problems in terms of handling legacy applications and overhead requirements.

Recently, the inventors here developed a system having singular functionality called the Workstation Host Access Manager (WHAM), which was a service that permitted access to mainframe CICS applications, 3270 terminal access, and IBM®'s External Call Interface (ECI). This application has been a successful implementation, but is narrowly focused. Indeed, the present invention is based on the basic approach undertaken in WHAM, but expanded to address numerous ancillary environments and provide a more robust system design framework.

OBJECTS AND SUMMARY OF THE PRESENT INVENTION

It is an object of the present invention to provide a system architecture that aggregates the coding into a single executable that is common to a diverse group of services to permit more robust and efficient service implementation.

It is also an object of the present invention to provide a data processing system for managing implementation of an expanding online capability that provides access to existing legacy programming and applications.

It is another object of the present invention to provide service based environment for online system support that provides access to a given application by replicating the application service on another linked computer (horizontal scaling) with traffic load automatically balanced between multiple servers.

It is another object of the present invention to provide a set of protocols that are used in developing and expanding software applications so that operation can proceed via Internet access from remotely located subscribers.

It is yet another object of the present invention to provide a data processing system that permits fault tolerance via the use of multiple instances of the same application of linked network servers. If any service fails, application traffic is automatically routed by the controller to a functioning version of the same service.

It is still another object of the present invention to provide a network controller for routing messages around the system infrastructure, performing load balancing, and maintaining schedules and directories on the system and its administration.

It is yet another object of the present invention to provide an integrated logging function that communicates with the operating system event logger to track user application use and system demand.

The above and other objects of the present invention are accomplished by a novel computer system that supports architecture for implementing and managing a modular message-based infrastructure that allows for development of online seamless services and applications. The new system is predicated on four functional interrelated capabilities. The first is the Framework API—or application program interface—and represents the function set necessary to allow interoperability of new applications and services by providing a common support for TCP and UDP messages and asynchronous responses. This is in conjunction with the "Framework", an executable program which provides thread management, connection management, and multi-casting in a multi-processing, multi-threaded environment, and defines the interface to the service specific functions. Next, is the Router, and this subsystem manages the interactions between system components much like an air-traffic controller, and routes the messages amongst the various system components. The Router is itself implemented using the Framework. In the case of the Routing Service, the service specific DLL (router.dll) implements a routing service that maintains a directory of available system services and pools TCP connections to these services. A Router service specific DLL (router.dll) uses some of the same components used to implement the Framework API. Finally, events are tracked using a system Logger, which provides historical data to permit debugging and other critical system maintenance functions.

In accordance with the varying aspects of the present invention, system architecture operates in a client-server environment with a plurality of individual services resident on one or more servers in the network. Clients operate within the network and access these services by initiating an instance of the Framework API, which allows network communication to the Framework supported services, associated with the application-specific DLL's necessary to permit access to the service and internetwork communication.

The Framework provides a standard, common body of code which supports existing services predicated on the service supporting DLL's. The Framework reads its configuration parameters at startup. Based thereon, the supporting services are instigated in accordance with availability. In the background, a heartbeat message is broadcast on the network, identifying and prioritizing available services.

The Framework Architecture consists of four attributes. The first is the skeletal service executable program, that forms the standard common body of code mentioned above, that supports new NT services on the network. The second attribute is an Abstract Base Class—ABC—an object template that defines the interface between the skeletal service program and the specific DLLs needed for service implementation. Third, the Framework includes a class that implements the minimal service message. And finally, the Framework includes support for message multi-casting (including broadcast and uni-cast) wherein the multi-casted message comprises network address and status information. As discussed above, the Framework requires a corresponding API (the Framework API) for its operation within the network.

The fundamental advantage of using the Framework resides in the speed in which new services may be added to the system. Since the Framework will include the coding needed to support interactions with the operating system for implementing TCP and UDP communications for a given service, the developer of that service access can avoid rewriting the complex communication code common to IP-based services. Once the functions of the Framework are understood, the developer creates new service access by preparing the service DLL that conforms to the Framework interface, and supplying the registry configuration keys. This is enhanced by customizing and extending the minimal message class object. The developer may choose to either inherit from or wrap the existing Framework API, to provide a simpler interface to their service.

The foregoing features of the present invention are best understood in the context of a specific illustrative embodiment thereof, taken in conjunction with the following diagrams, of which:

BRIEF DESCRIPTION OF THE FIGURES

FIG. 4 is a functional block diagram of the interface structure for the present invention;

FIG. 5 is a functional block diagram representing the router messaging;

FIG. 6 is a functional block diagram depicting message path dynamics;

DETAILED DESCRIPTION OF THE INVENTION

Figure 1:
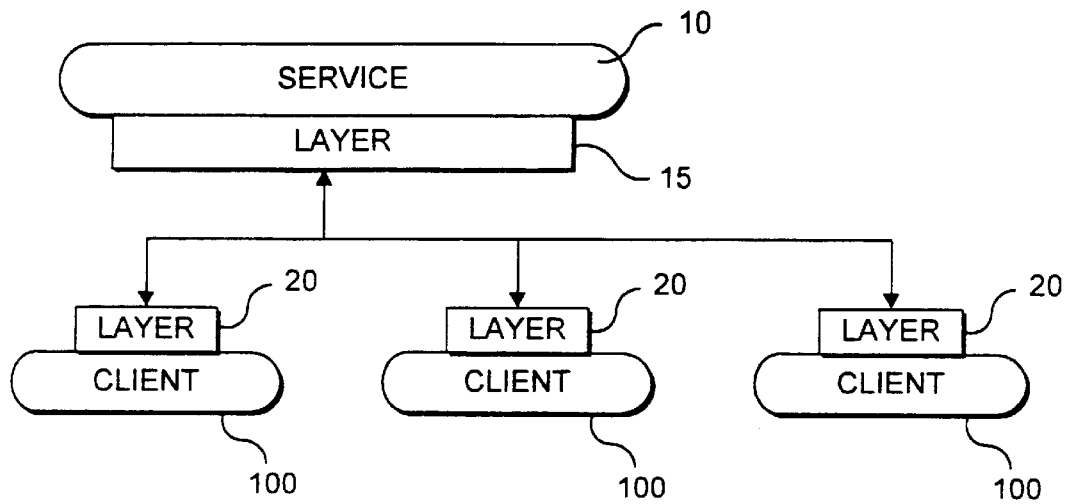
FIG. 1 is a schematic diagram of the system operating environment for the present invention.

First briefly in overview, the present invention is a program controlled computer system comprised of multiple client nodes interconnected in a network to one or more central servers and linked to a variety of select services for information retrieval and provision in accordance with program logic. Users on the network access individual services by starting an application that is compliant with the Framework API. In this context, "services" is broadly construed to cover any remote programming system that receives instructions and performs useful functions to provide a response. Examples will include an E-mail service, real time market data provider (price quotes), account database, and the like. The Framework includes the necessary protocols for navigating the network—independent of the service requested by the client.

The Framework API (API.dll) represents the set of functions necessary to allow communication from client applications to one or more compliant services. The Framework API maintains a directory of available services. The directory is constructed and updated from "heartbeat" messages received as UDP datagrams, that are sent by the compliant services configured to do so. These services are configured to send heartbeat messages as datagrams to specified IP addresses and ports. In turn, the Framework API is configured to receive heartbeat messages on specified ports.

The Framework API can also be configured to join an arbitrary number of multi-cast group addresses. When configuring a new service to send heartbeat messages, a list of IP address/port pairs is specified. The IP addresses used in these lists can be Class A, B, C, or D addresses, plus the broadcast address. This feature makes the configuration of a service environment extremely flexible, allowing service grouping, zoning, and many other partitioning models. In addition, any existing service can be instructed to add or delete IP address/port pairs from its list of heartbeat message recipients.

When a service begins execution, it obtains its service specific name from the operating environment and uses the name to obtain its specific configuration in the NT registry. One of its required configuration parameters is the name of an accessible DLL that implements and exports a class object derived from the Generic Server Interface class (an abstract base class with six pure virtual functions). Two other entry points are required to be exported from the DLL, and are used to dynamically instantiate an object of the derived class and to release an object of the derived class. Within the Framework, the derived class object is referenced as a pointer to an instance of the abstract base class. In this manner, service specific functionality is accessed from a common interface and is logically separated from the processing and control associated with and common to almost all IP-based service programs.

Upon invocation, the Framework loads the modules necessary to communicate with the selected services. These modules are stored in a library of similarly configured routines, known as dynamic link libraries, or DLL's. It is the specially configured DLL that gives the Framework program its identity and functionality as it relates to the specified service. For an E-mail program, the DLL provides that functionality associated with E-mail processes while the Framework provides the communication and network protocols to permit these processes to go forward. In this way, the Framework establishes the layer between the service and the client making the requests.

The Framework operates in conjunction with the Router. The Router allocates service resources and routes client requests to the available services and thus maximizes distribution efficiencies. The Router operation relies on network multi-cast (including full broadcast, or limited uni-cast) of heartbeat messages by the individual services. Specifically, the services periodically send out on the network an address and status message—indicating service location and whether the service is "available" or "not available". These messages are received by the Router and based thereon, the Router decides where to send the next service request, applying appropriate load balancing algorithms.

Finally, the present invention includes as a separate aspect, a system maintenance component that allows for tracking and debugging of system performance issues.

With the foregoing brief overview in mind, attention is now directed to FIG. 1, which depicts the present invention in schematic form. This is a simplified representation of the clients, 100 interconnected to a network comprising, inter alia, one or more services, 10. Communication between clients and services are via established network programming constructs, e.g., "sockets", using per se network protocols. The preferred environment for the present invention is a Windows NT operating system, Version 3.5 or 4.0. Alternatively, network environments such as Novell with a Unix operating system, may be implemented to obtain the benefits of the present invention.

In this arrangement, the Framework acts as a controlling layer negotiating the communications and data transfers between the clients, 100 and the service 10. In this context, the Framework takes on multiple roles, depending on the service DLLs selected and loaded. At the client, 100, the Framework API, 20, loads the modules (DLLs) that control the formatting of the messages, manage outgoing service requests and collect incoming service responses from the network. Similarly, a separate instance of the Framework, 15, is loaded at the service, 10 which invokes the DLLs for coordinating the processing of client requests—communicated to the service by the network—and generating the responses for return to the client 100 via the network.

Figure 2:
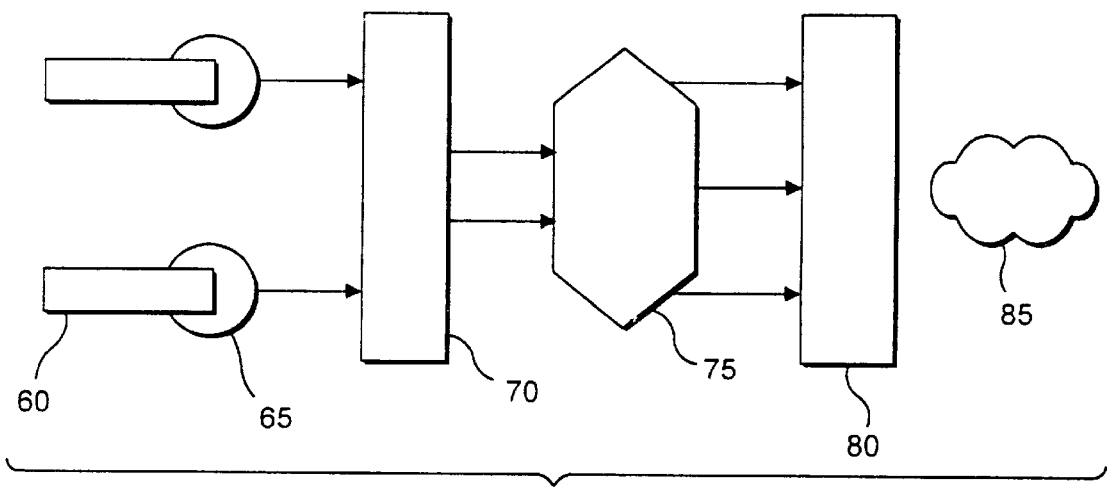
FIG. 2 is a functional block diagram depicting the operating components of the present invention.

The process for accomplishing the arrangement in FIG. 1 is outlined in FIG. 2. Moving left to right, the client computer loads the Framework API and service API DLLs for the selected service upon request for that service by the client. Specifically, the client message, 60 is formatted via formatting protocol 65. The formatted message is then configured via the Framework API (application program interface) block 70 for transmission across the network. The API includes the supporting protocols for TCP and UDP communications. It also maintains asynchronous responses and multiple connections to the Framework.

Continuing with FIG. 2, the message is sent into the local area network LAN (in this example, via the Internet); and received at the service supporting computer (network server or mainframe). Upon receipt, the Framework, 75 with associated service DLLs, 80, provides the DLL interface definition, the thread pool, connection management, broadcasting, TCP and UDP message handling, Windows NT service interface, and parameterization in accordance with the system Registry entries. The service specific DLL provides the message management conforming to that service. For example, for a database management system, the service functions includes culling data from the database and preparing formatted reports for return to the client. The bridge to these functions is created by the service DLL, which includes the base formatting data to recognize the original request of the client generated message. In accordance with the request, the service pulls the data from the ultimate source 85 and prepares a return message comprising the requested data—reversing direction and returning to the client the responsive information.

The foregoing structure is particularly useful for Internet applications using a TCP/IP (Internet protocol). It is also possible to structure the Framework to operate using named pipes instead of or in conjunction with the IP format. In the alternative, the mainframe may be a separate corporate information vendor, such as MarketData, and the message passed inter-corporate.

Figure 3A:
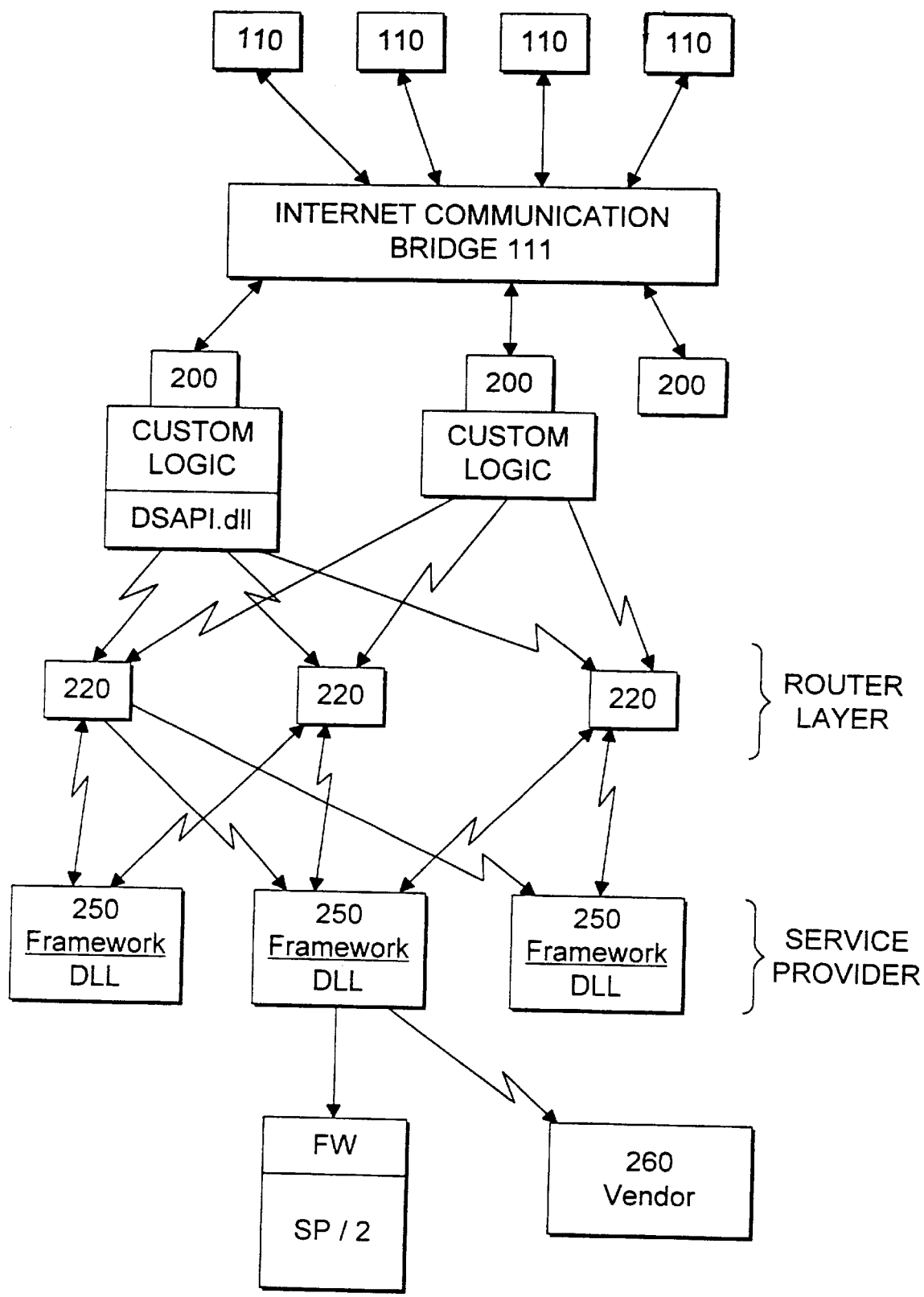
FIGS. 3A and 3B provide an overview of the system environment for the present invention.

Turning now to FIG. 3A, the above system architecture is applied to an internet-based communications network. In this particular context, there are two "client-server" pairs of interest. The first involves client 110 and servers 200 linked by the internet communication bridge 111. Communication across the internet is accomplished through established techniques including modem, ISDN and the like, using a TCP/IP protocol. The servers 200 include HTTP server software for processing Internet client requests. Exemplary service software includes products from Netscape®, Inc. and its enterprise server package and the corresponding product from Microsoft®, Inc. In addition, these servers will often include "fire walls" (not shown)—sophisticated gateways insulating the server from unauthorized access and manipulation. The servers 200 include custom logic designed to process the Internet request, as directed to that server by the client 110.

Continuing with FIG. 3A, the second client server pair is between HTTP server 200 and the network servers 220

(plural servers depicted in this Figure). Focusing on this relationship, the network servers 220 act as Routers (see below) to direct messages to available services. Access to these services are through the system servers 250. One or more instances of the Framework is initiated on server 250 invoking the service DLL associated with the initial client request. As described below, once initiated, the Framework manages the connections and data transfers to support the specific service invoked. For example, the market data service is provided by invocation of the market data DLL by the Framework which then manages the communications to the outside vendor 260. In a similar manner the Framework, by invoking the Mainframe access DLL, supports communication to the Mainframe via SP/2. The above Router servers, 220, depicted in FIG. 3A, provides an illustrative example of Router operation. In this arrangement, the Router operation exists on a server no different than that depicted in block 250, and the Router represents another "service". This service is provided by the invocation of the Router.dll by the Framework, and directs access to the service providers ("services") based on availability.

Figure 3B:
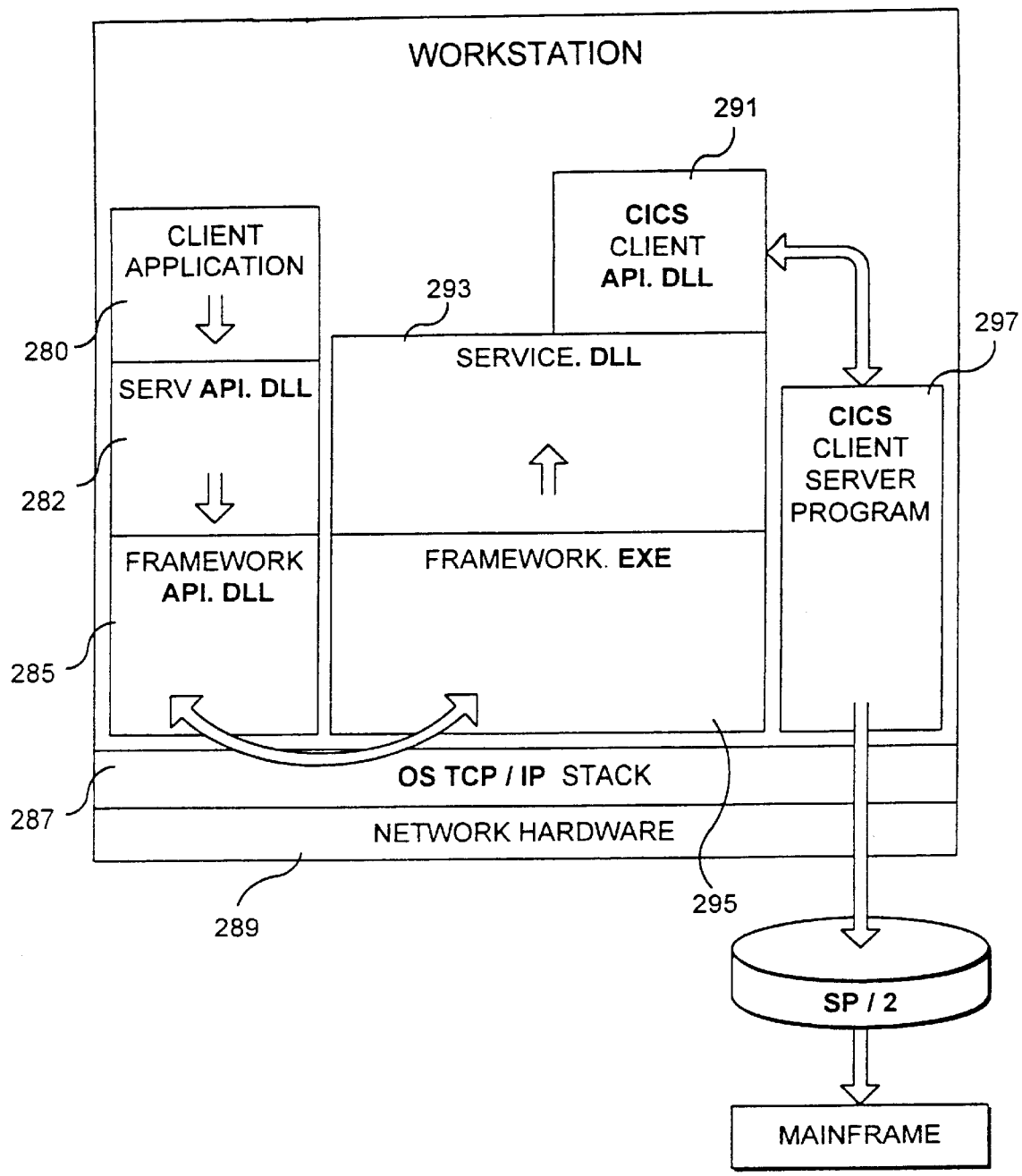
Figure 7A:
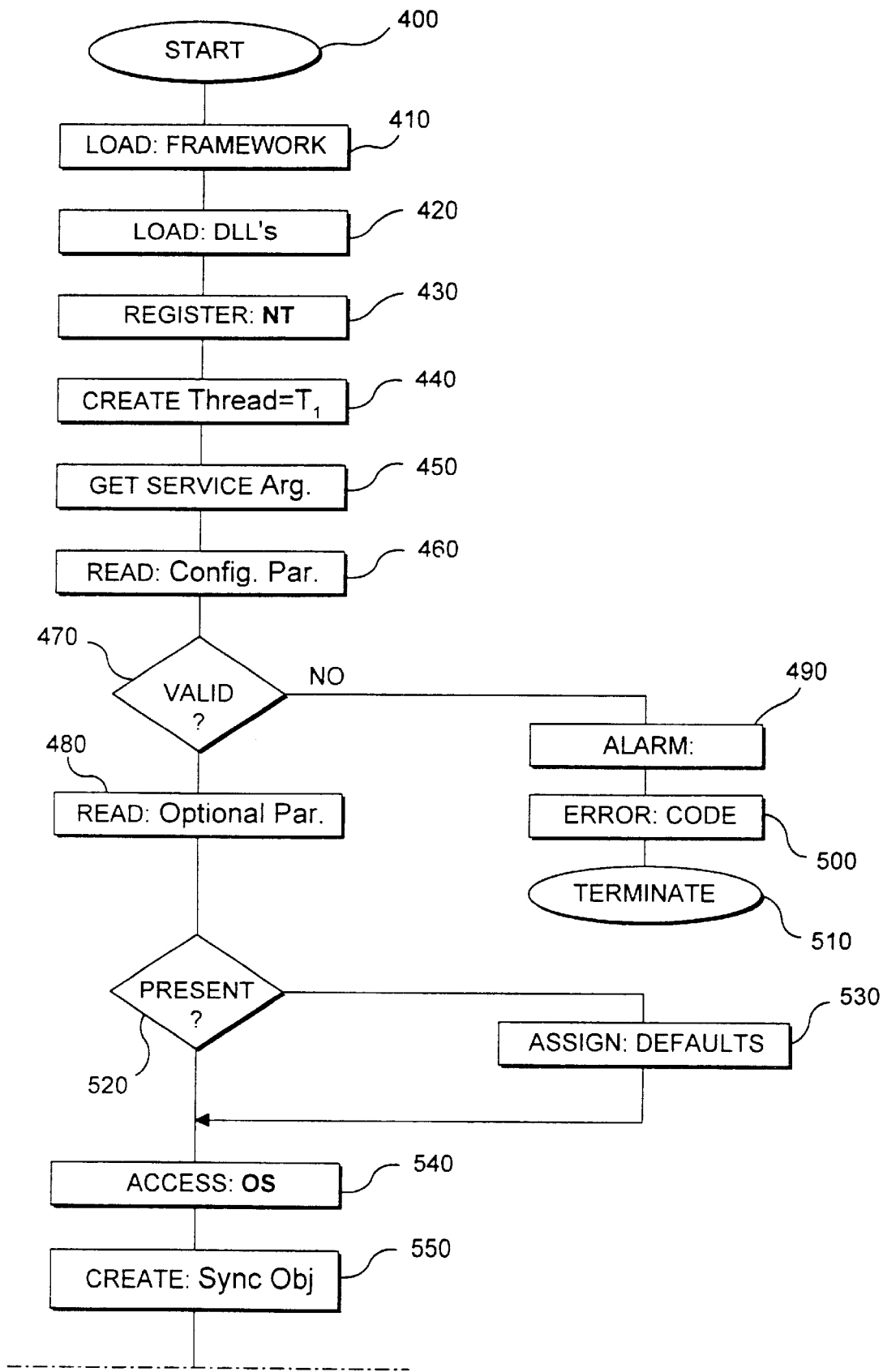
FIG. 7 is a logic flow diagram depicting the operation of the Framework module.
Figure 7B:
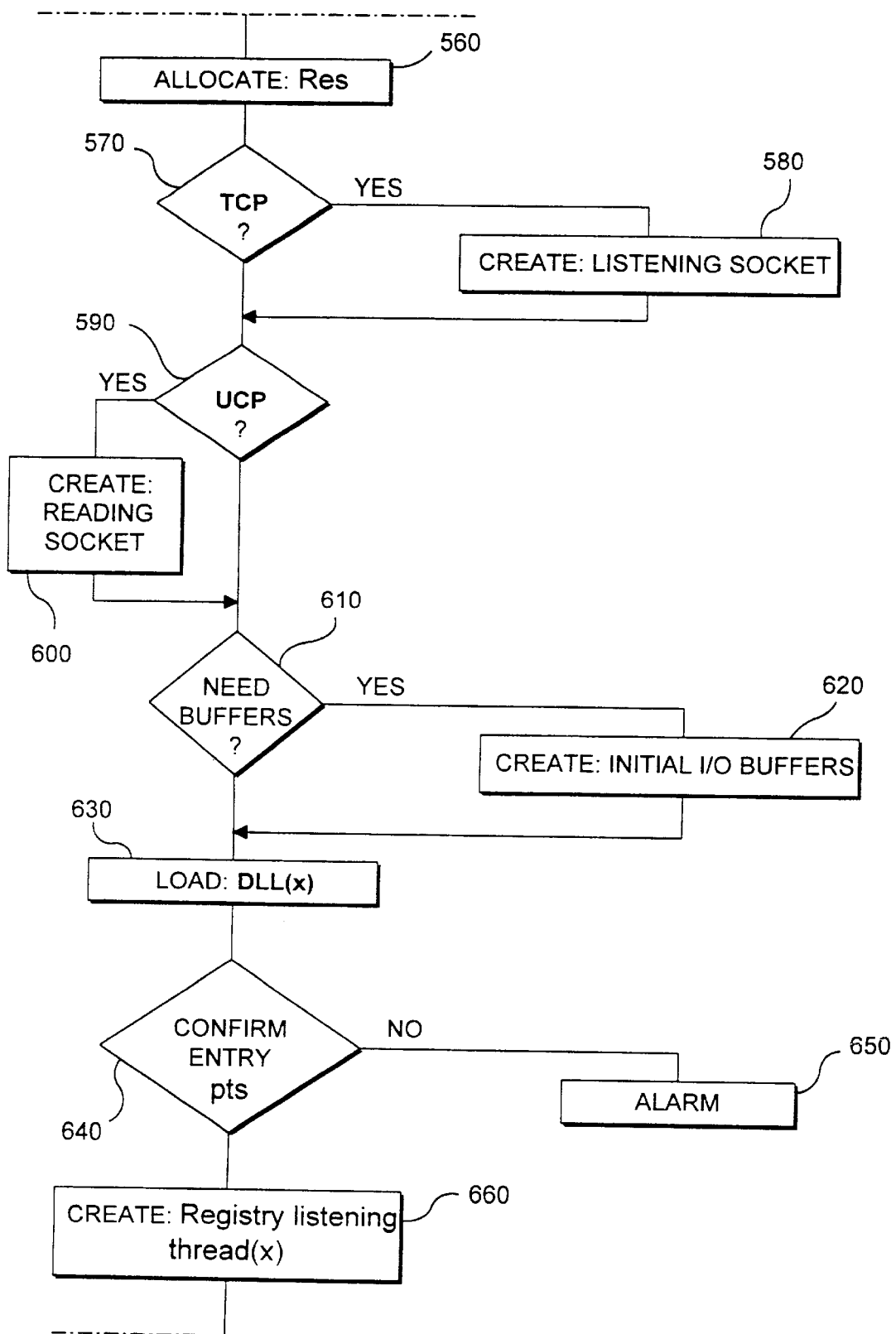
Figure 7C:
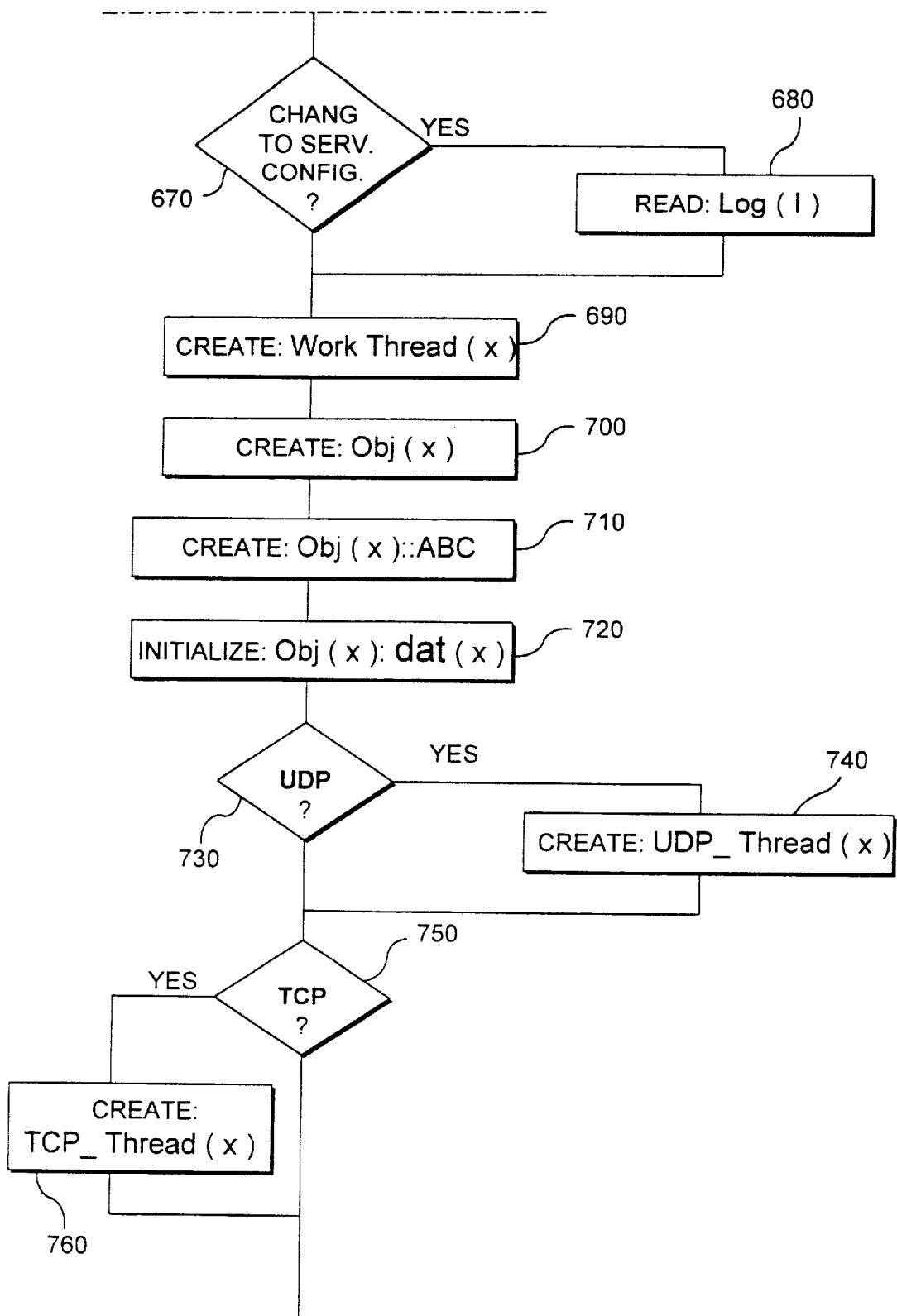
Figure 7D:
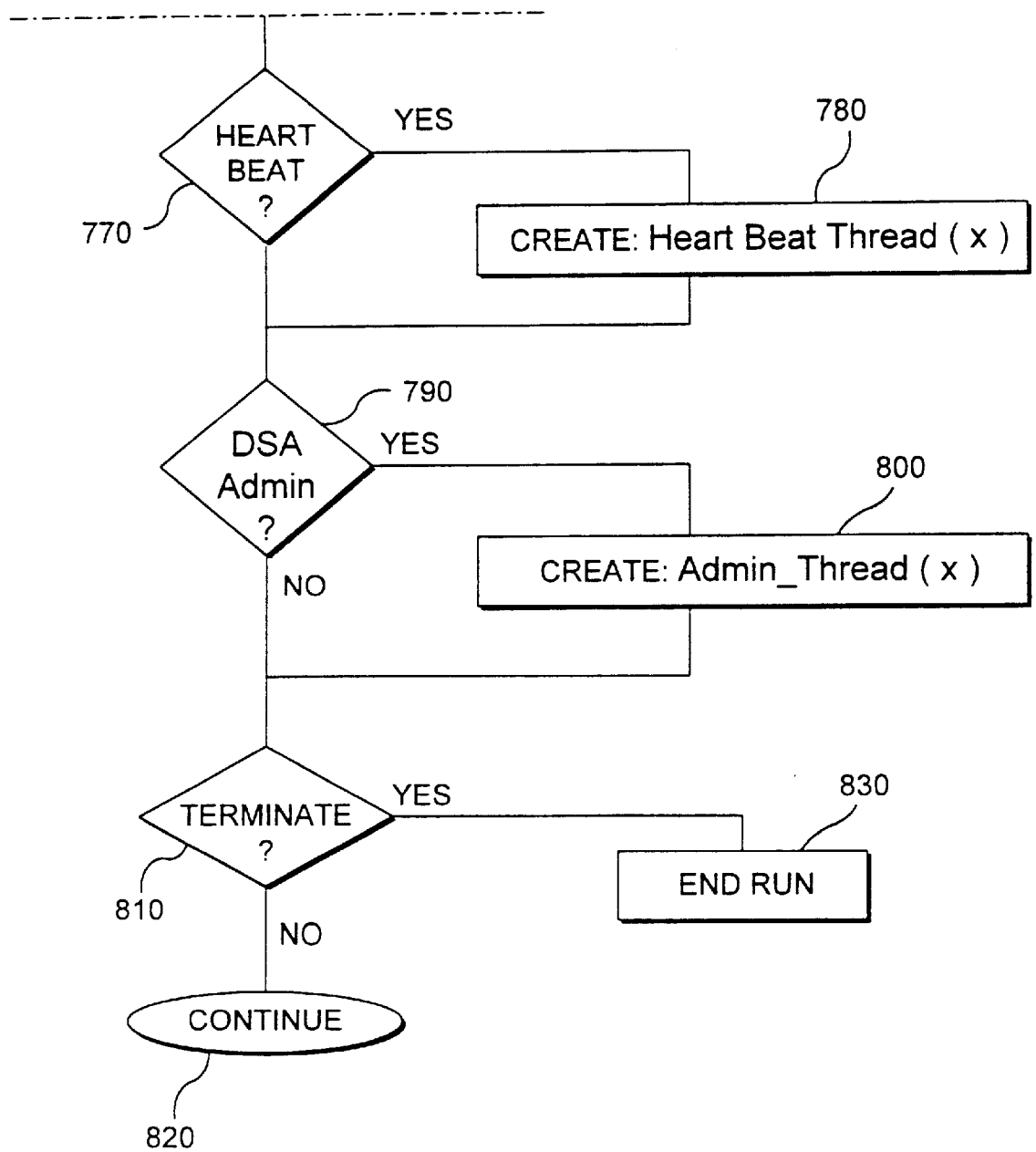

The foregoing arrangement depicted in FIG. 3A, presents the implementation utilizing a separate Router layer. For smaller scale operation, the Router layer may not be required, and operation between the service provider and the client accomplished on a single piece of hardware (computer). This is represented in FIG. 3B, wherein the workstation 279 includes a number of programming layers and interfaces (depicted graphically). In this arrangement, the service sought by the client is 3270 emulation, 280. This program implements the service API.dll, 282, and the Framework.dll, 285, and communicates across the operating system TCP/IP stack, 287. Messages pass from the stack to the Framework, 295, implementing the corresponding emulator DLL, 293, and the service API.dll, 291, utilizing shared memory for IPC (interprocess communication). The CICS client API communicates with the client server program, 297, which passes the message through the stack and to the external Mainframe for implementation.

FIG. 4 provides an exemplary internet communication path to the mainframe CICS application, wherein the layers 15 and 20 from FIG. 1 are respectively depicted on the left and right side. The individual programming layers are depicted on each side of the central communication path. For the client, the message requires formatting by the DLL modules for the specific service, ServAPI.dll, invoked by the Framework API, and passes onto the communication path via the OS. On the receiving side, the server includes the OS, followed by the Framework layer with the loaded Serv.dll. Serv.dll may or may not be followed by, rely on, or communicate with other modules to support its service functionability. In this diagram, the CICS client processes the request message, representing the optional back-end data source.

To effect these message transfers, the Framework includes an abstract base class that defines six pure virtual functions for implementation. The first four functions are for processing messages, while the latter two support initialization and termination. For example, whenever the Framework receives a message over a TCP port from a client, it invokes the Process TCP( ) function to process the client message. In this context, the I/O buffers that the Framework creates are sized based on the initialization code configuration specified by the service DLL. Because the incoming message includes its size, the Framework can dynamically adjust the buffer allocation accordingly. An alternative approach allows detection of message boundaries, to be determined by a custom implementation of the default abstract base class function called by the Framework. When a client connects to the TCP port, worker threads begin I/O reads until an entire client message is read. The Framework then places the client request onto a request queue and invokes the DLL methods to implement the request in sequence and in accordance to that service operation. In operation, the Framework insures that the memory buffers are large enough to accommodate the incoming messages before passing them on to the client DLL process TCP( ) methods.

The next series of diagrams reflect the use of the Router in support in service allocation. Turning now to FIG. 5, the Router resides on a server as part of the network and thus in the path for all incoming service requests. In this context, the Router 220 receives the service requests from the client with the appropriate formatting. Concurrent therewith, the Router also receives heartbeat data regarding the availability of the actual service sources on the network—with each service instance providing a broadcast of the "available" or "not available" message. Service connection management is handled separately, block 230, while the heartbeat A passes in the background. For example, there may be nine separate MarketData services on the network, and requests are routed by the Router depending on the availability and usage of each—as indicated by their individual heartbeat broadcast. The current available and loading data for each service is separately stored in the DSA directory 210. In accordance with stored availability data, the Router repackages the message with the appropriate server address and passes it on.

Turning now to FIG. 6, the above general process is depicted for a specific process—CICS access by a client through the Internet via a HTTP (hypertext transfer protocol) server, 250. In this context, the client makes a data request that can only be satisfied by a CICS operation on the Mainframe through node 240 where it is packaged at server 250 with the appropriate API in accordance with the HTTP connection. The message with the API is then passed to the Router 270 which then directs the message to the most available service provider 280 in accordance with incoming broadcast heartbeat data. The Framework on service provider 280 directs the message onto the service itself—in this context, SP2, 290, and through to the Mainframe 300 for CICS operation.

The operation of the Framework is delineated in the flow chart of FIG. 7, wherein operation conceptually begins at block 400 with NT loading of Framework, 410. Based on the service requirements, the Framework triggers the appropriate dependencies—and supporting DLLs (e.g., socket support, etc.) are implicitly loaded into the process address space for functional support for the service, 420. The service name is then copied to a private variable and registered with NT service control manager 430. All this is accomplished with the initial processing thread To; at block 440, the first process thread T1 is created.

Once T1 is started, Framework gets the service arguments and reads the configuration data, block 460. This includes the DLL name, service ID, version, TCP port, UDP port and the Framework port. At test 470, the system tests and validates the required parameters, with defects leading to alarm 490, error code 500 and run termination—which takes the particular service off line.

At block 480, the system then reads the optional parameters, 480; if absent—tested at 520—default values are assigned. These optional parameters may include selected targets for heartbeat message multi-cast. If so, the system builds a list for these targets, to support heartbeat message broadcast. At block 540 Framework accesses the operating system and creates synchronization objects, 550 and sets up resources required to implement the service connection, block 560.

Test 570 determines whether listening socket is applicable; if so, the TCP socket is created at block 580. Likewise, test 590 checks for UDP reading socket which is created at block 600 if applicable. In accordance with the above assignments, initial I/O buffers are created. This is accomplished at test 610, and, if required, block 620.

The Framework thereafter loads the service DLL, block 630 and confirms the entry points, test 640; at block 660, the listening thread registry is created. The listening thread listens for changes to the service configuration key; if change occurs, the log levels are re-read, block 680.

Next, the Framework creates the worker threads; these are set in place to implement the service functionality. The number of worker threads (minimum and maximum) are optional parameters that are stored in the registry. This is followed by the creation of the abstract base class object, block 700 from the DLL (template object X). This object data is then initialize, block 720. Operation depends on the communication. If UDP socket, Framework creates a supporting UDP thread; test 730 and block 740. In a similar way, if TCP socket, a TCP thread accept is created; test 750 and block 760. The Framework may test for both heartbeat information and general administration requests, via tests 770 and 790, respectfully. To the extent active messages on these are expected, associated threads are assigned at blocks 780 and 800. Otherwise, the Framework remains resident until terminated, test 810 and block 830.

Figure 8A:
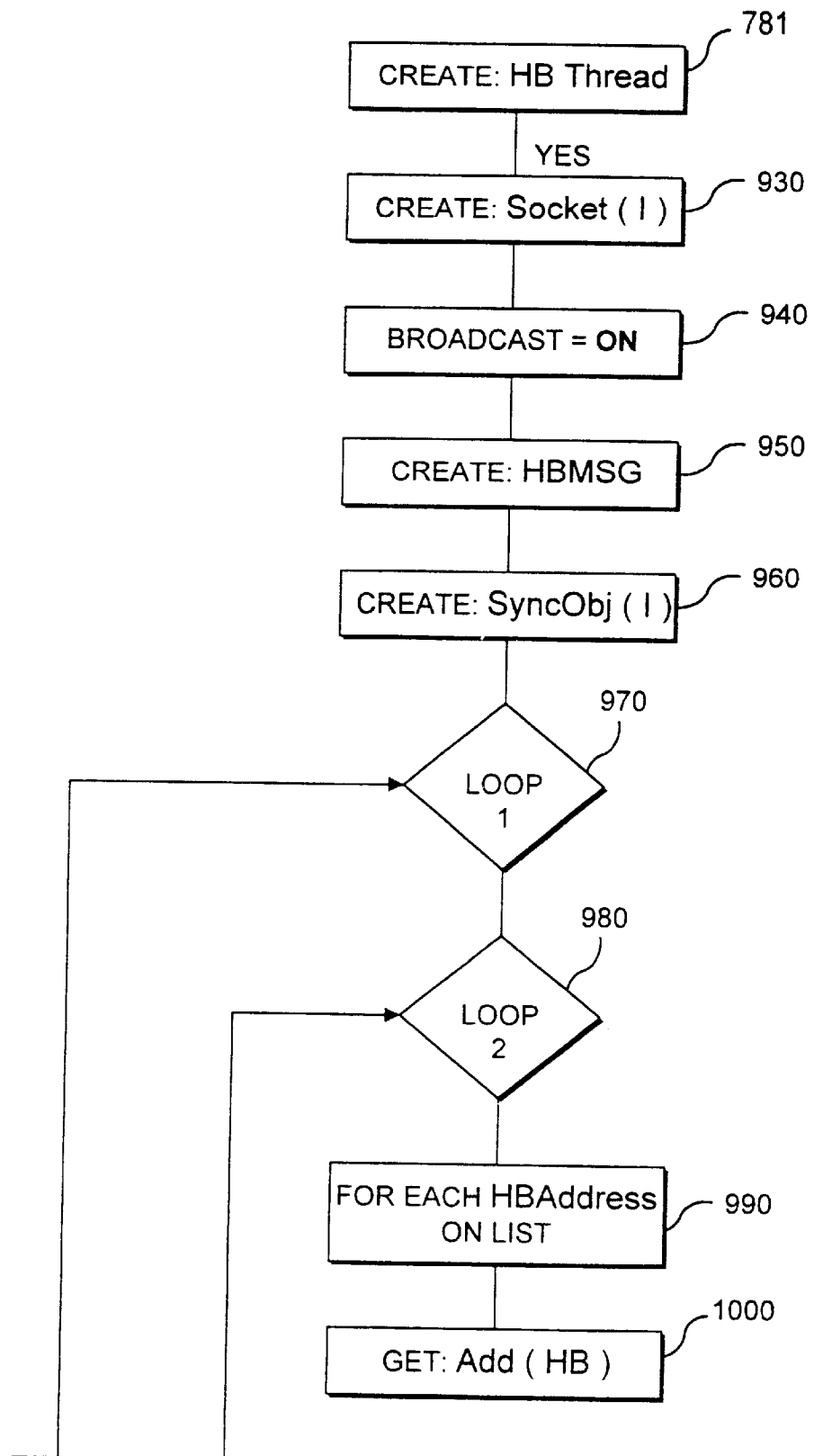
FIG. 8 is a logic flow diagram depicting the operation of the heartbeat module.
Figure 8B:
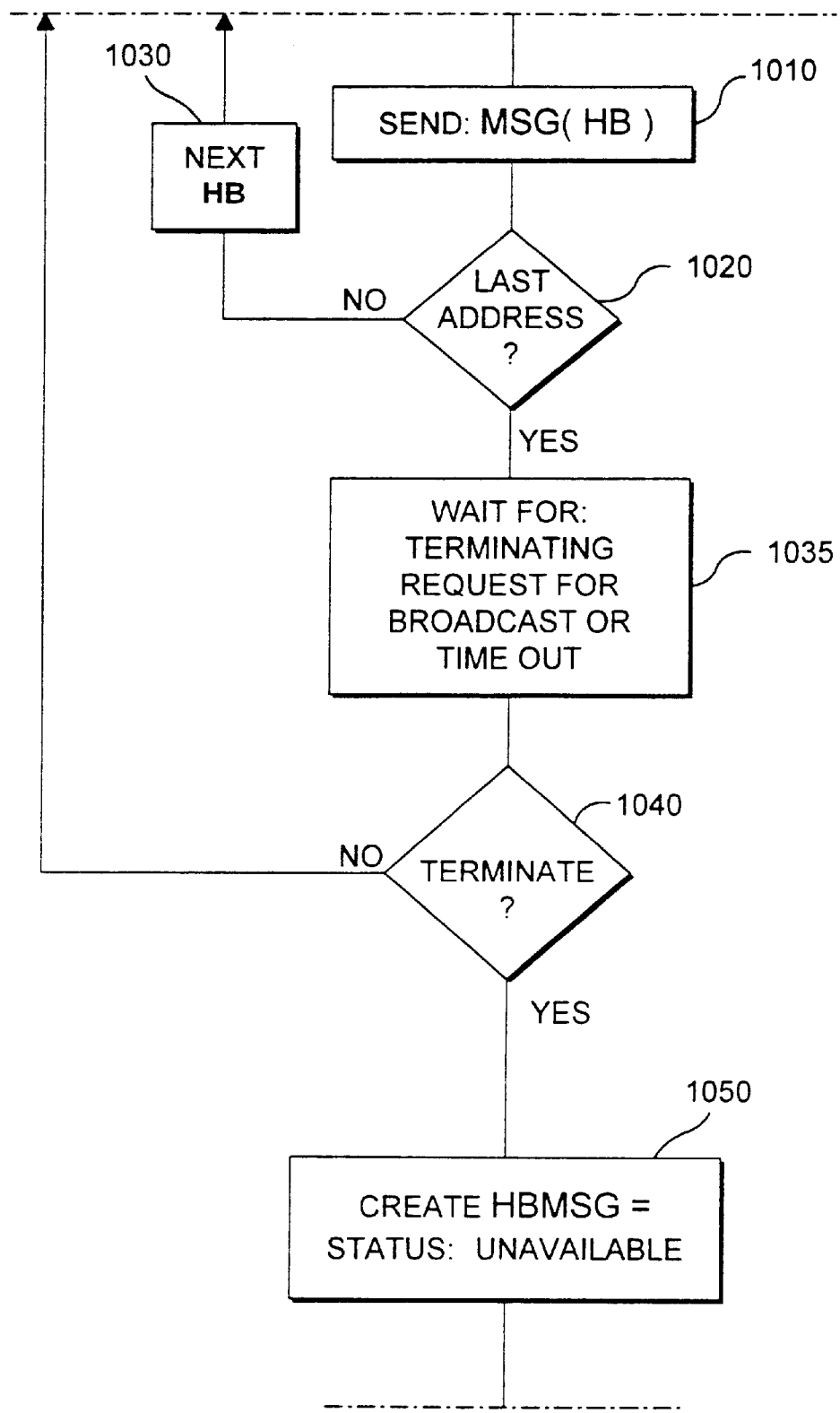
Figure 8C:
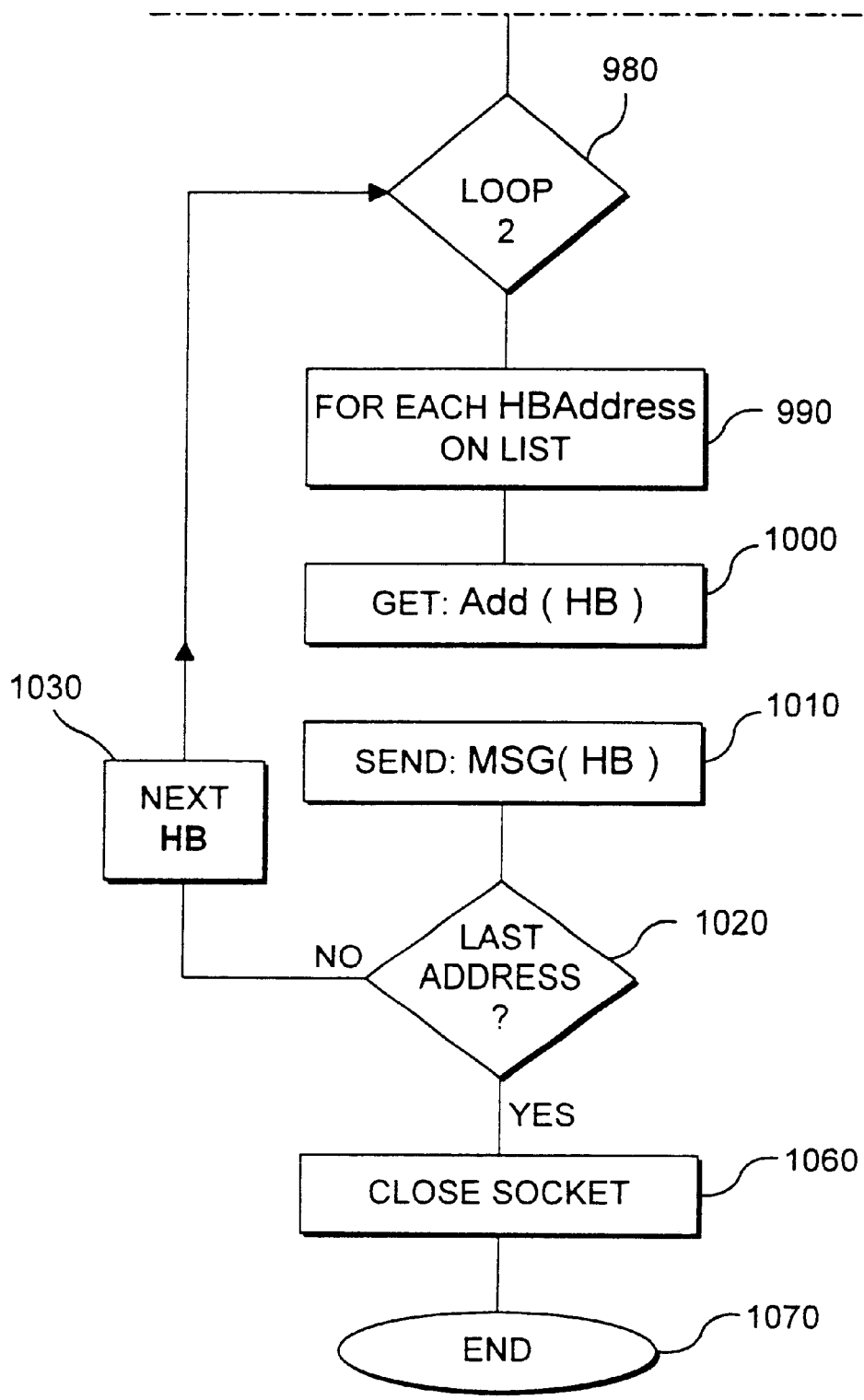

Turning now to FIG. 8, the implementation of the heartbeat service monitoring process is presented. Logic conceptually begins at block 781, from FIG. 7 to block 780, and socket creation, block 930. Next, broadcast capability is initiated, block 940. The system then creates the heartbeat message, HBMSG for the socket, and the associated synchronization object to support message broadcast, block 960. The HBMSG includes the IP address, TCP port, UDP port, service ID, and status.

Continuing with FIG. 8, the first Loop is initiated at test 970, followed by nested Loop 2, test 980. In nested Loop 2, the system increments through each message target, block 1000, and, in sequence, sends out the heartbeat message to each target address, block 1010, (uni-cast for single target). This continues until the target list is empty and Loop 1 terminates, block 1020. The second Loop, Loop 2 is governed by three factors: (1) the broadcast frequency setting, i.e., the periodic rate of heartbeat message sending, triggered by a "time out" clock signal, (ii) the receipt of a termination signal, or (iii) request for broadcast signal. Any of these will pass logic to test 1040.

If no termination is registered, test 1040 returns the process to the beginning of Loop 2 and a repeat of the broadcast cycle, defined by blocks 980 to 1035. If, however, process is interrupted by a termination signal, the system creates a service=unavailable message, block__, which is then sent out via blocks__ to __ (same as Loop 2 above). Thereafter, the service closes down —dropping ports and sockets, and the run ends.

In FIG. 7, worker threads are created at block 690. The Framework manages these worker threads in accordance with the logic depicted in FIG. 9, starting with block 2000, and thread loop 2010. The initial command is a wait state, block 2020, waiting for (i) termination signal, or (ii) request ready signal. The operating system can also interrupt the thread from its wait state to notify it that a previously requested asynchronous I/O operation has been completed. Logic continues to test 2030, wherein the system queries for a termination command; if affirmative, logic proceeds to block 2100, "exit". If, however, thread was interrupted by the operating system's notification that a previously requested asynchronous I/O operation has been completed, then control is passed to block 2033 (see FIG. 9A). If the test at block 2030 indicates that the "request ready" signal terminated the wait state, then logic proceeds to block 2040, and the thread pulls the first available request structure from a queue. At block 2050, the system branches on the type of request.

Figure 9:
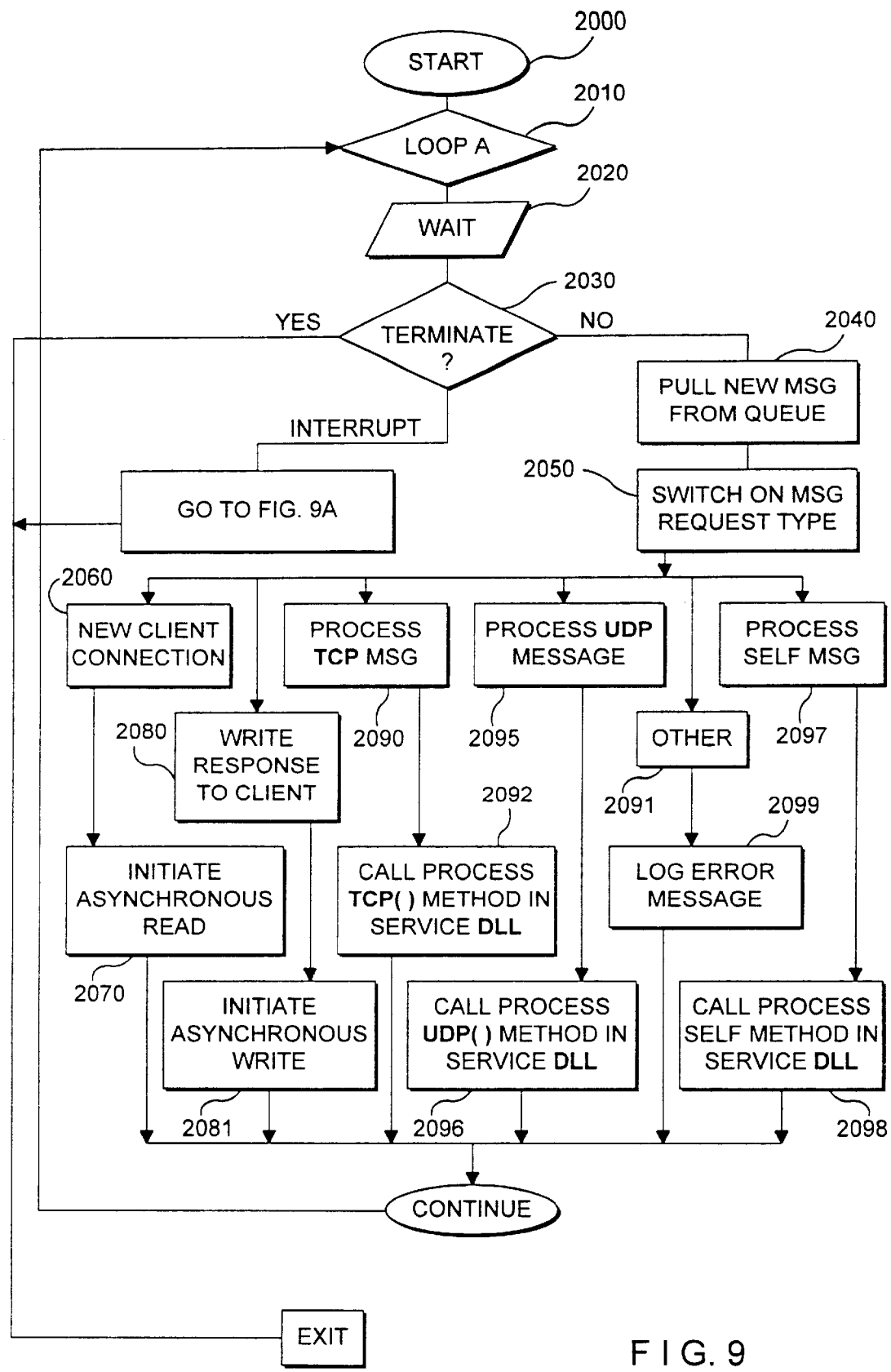
FIG. 9 is a logic flow diagram depicting the operation of the worker thread manager.

Continuing with FIG. 9, there are six possible outcomes for the branch at block 2050. At block 2060, the request from the queue reflects a new client TCP connection to the Framework. This results in a request by the thread to the operating system for an asynchronous READ operation at block 2070. The result of this asynchronous READ operation will be handled by the code indicated by block 2033 (and in FIG. 9A) at the convenience of the operating system. After the asynchronous READ operation is initiated, thread control resumes at block 2020.

If the queued request retrieved at block 2040 is a request to write a response message back to a client process, then block 2080 gains control. Here an asynchronous WRITE operation is initiated by a call to the operating system, and as is the case for the asynchronous READ operation requested in block 2070, the result of the WRITE operation will be handled by the code indicated by block 2033 (and in FIG. 9A) at the convenience of the operating system. After the asynchronous WRITE operation is initiated, thread control resumes at block 2020.

Three other expected types of requests are detected by block 2050. These include a request to process a TCP message at block 2090 (which indicates that the Framework has received a full client request by means of its TCP connection with the client), a request to process a UDP message at block 2095 (which indicates that the Framework has received a full client request by means of its UDP datagram socket), and a request to process a message that the explicitly loaded service DLL has sent to itself (block 2097) through methods exposed in the interface, as implemented in the abstract base class discussed earlier. The threads calls the method in the service DLL's derived class that corresponds to the type of request, as reflected in blocks 2092, 2096, and 2098, respectively. Control flow then reverts to block 2020 as in the previous two cases.

If any other request type is received at block 2040 and detected at block 2050, then it is considered an unknown request type. And is represented by block 2091. The only action taken is at block 2099, which is to write a message that an unknown request type was received. The message is written to a local disk file. As in the previous cases, control then resumes at block 2020.

Figure 9A:
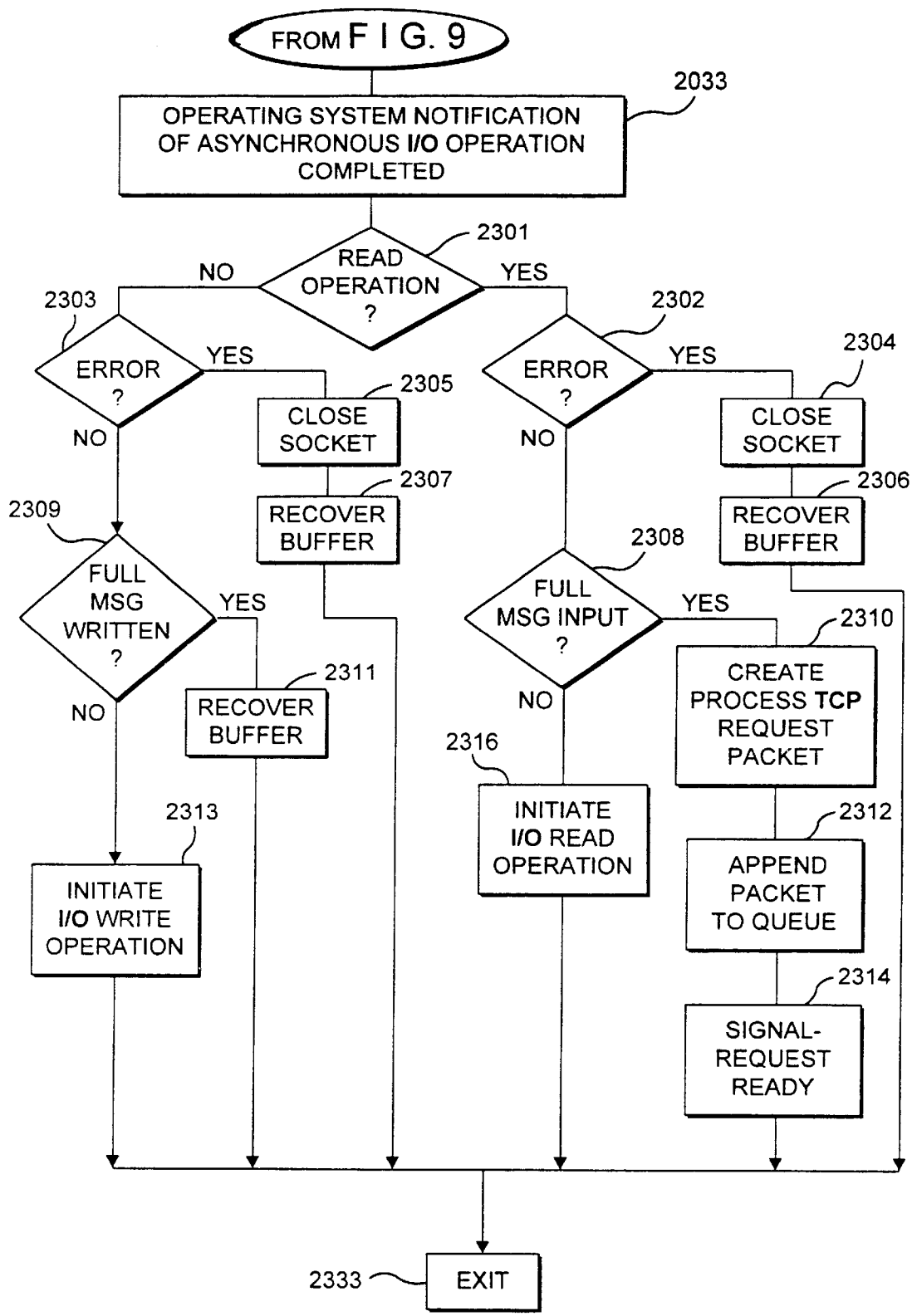

Let us now examine the activity represented in FIG. 9 by block 2033 and detailed in FIG. 9A, beginning at block 2033. FIG. 9A represents the activity a worker thread makes when the operating system notifies it that one of its previously requested asynchronous I/O operations, either a READ or a WRITE, has been completed. At block 2301, the thread tests to determine whether the operation that completed was a READ or a WRITE operation.

If a READ operation, then control flows to block 2302, where a test is made to determine whether the READ operation encountered some kind of error. If so, then block 2304 receives control and closes the TCP socket for which the error occurred, and then recovers the data buffer at block 2306 for use later in other I/O operations. If no error occurred, then block 2308 receives control and tests to determine whether the I/O operation resulted in a full client message being received over the socket. If the test is affirmative, then control is passed to block 2310, which creates a request packet and marks it to indicate a Process TCP request as mentioned in the discussion of FIG. 9. Block 2312 then places the request packet on the end of a queue, and then block 2314 signals the "request ready" signal that all worker threads wait upon (as shown in block 2020 of FIG. 9). If the test for a full message is negative, then the thread must initiate another asynchronous I/O READ operation on the socket in order to receive more data. It does this at block 2316.

If a WRITE operation, then control flows to block 2303, where a test is made to determine whether the WRITE operation encountered some kind of error. If so, then block 2305 receives control and closes the TCP socket for which the error occurred, and then recovers the data buffer at block 2307 for use later in other I/O operations. If no error occurred, then block 2309 receives control and tests to determine whether the I/O operation resulted in a full response message being sent over the socket to the client. If the test is affirmative, then control is passed to block 2311, which simply recovers the data buffer for later use. If the test for a full message is negative, then the thread must initiate another asynchronous I/O WRITE operation on the socket in order to ensure that all date is sent to the waiting client. It does this at block 2313.

Although the invention has been described in detail for the purpose of illustration, it is to be understood that such detail is solely for that purpose and that variations can be made therein by those skilled in the art without departing from the spirit and scope of the invention.

What is claimed is:

1. A computer system for implementing and managing a message-based protocol that is adapted to provide any of a plurality of online services over a communications network, wherein the system comprises
   (a) an application program interfacing mechanism adapted to send and/or receive messages;
   (b) a framework mechanism adapted to provide at least one of: thread management, connection management, and multicasting; so as to provide an interface to at least one online service;
   (c) a routing mechanism adapted to route messages and message responses between the application program interfacing mechanism and the framework mechanism;
   (d) the framework mechanism further adapted to broadcast periodic heartbeat messages on the network to identify and prioritize any of a plurality of online services.

2. The computer system of claim 1 further including a processing mechanism equipped to execute a common program that provides an interface to any of a plurality of online services.

3. The computer system of claim 2 wherein the processing mechanism is further adapted to implement at least one of the routing mechanism, the framework mechanism, and the application program interfacing mechanism.

4. The computer system of claim 3 wherein the processing mechanism is equipped to provide interoperability with legacy programming and applications.

5. The computer system of claim 1 further comprising a plurality of linked servers, wherein access to a given application service is provided by replicating the application service on any of the plurality of linked servers.

6. The computer system of claim 5 further comprising a mechanism for balancing load among the plurality of linked servers.

7. The computer system of claim 1 wherein the message-based protocol is further adapted to provide for development and/or expansion of software applications.

8. The computer system of claim 7 further comprising an access mechanism by which the software applications are accessible to remotely located subscribers over the Internet.

9. The computer system of claim 5 further including a fault tolerant mechanism by which multiple instances of the same application are provided across the plurality of linked servers.

10. The computer system of claim 9 further including a rerouting mechanism which, upon failure of an application at a linked server, reroutes traffic for that application to a functioning version of that same application.

11. The computer system of claim 10 wherein the rerouting mechanism is implemented by the processing mechanism and/or the routing mechanism.

12. The computer system of claim 5 further including a network controller for at least one of: routing messages throughout the computer system, performing load balancing among the plurality of linked servers, and maintaining schedules and directories related to administration of the computer system.

13. The computer system of claim 1 further including a logging mechanism adapted to track subscriber application use and demand.

14. A method for use with a computer system having
   i) an application program interfacing mechanism adapted to send and/or receive messages and message responses;
   ii) a framework mechanism adapted to provide at least one of: connection management, thread management, and multicasting; so as to provide an interface to at least one online service; and
   iii) a routing mechanism adapted to route messages and message responses between the application program interfacing mechanism and the framework mechanism, The Method Including the Steps Of
   a) initiating operation of the application program interfacing mechanism so as to provide networked communication between an online service and a prospective user of that service over a communication network;
   b) initiating operation of the framework mechanism by reading one or more configuration parameters stored in a storage device coupled to the framework mechanism and, in response thereto, initiating one or more online services in accordance with service availability; and
   c) the framework mechanism causing the broadcast of periodic heartbeat messages on the network to identify and prioritize any of a plurality of available online services.

15. The method of claim 14 further including the step of the computer system executing a common program that provides an interface to any of a plurality of online services.

16. The method of claim 15 further including the step of providing interoperability with legacy programming and applications.

17. The method of claim 14 further including the step of providing access to a given application service by replicating the application service on any of a plurality of linked servers.

18. The method of claim 17 further including the step of balancing load among the plurality of linked servers.

19. The method of claim 14 further including the step of utilizing the message-based protocol to provide for development and/or expansion of software applications.

20. The method of claim 17 further including the step of providing application service access to any of a plurality of remotely located subscribers over the Internet.

21. The method of claim 17 further including the step of providing fault tolerant operation by which multiple instances of the same application are provided across the plurality of linked servers.

22. The method of claim 21 wherein, upon failure of an application at a linked server, the computer system performs the step of rerouting traffic for that application to a functioning version of that same application.

23. The method of claim 17 further including at least one of the steps of: routing messages throughout the computer system, performing load balancing among the plurality of servers, and maintaining schedules and directories related to administration of the computer system.

24. The method of claim 14 further including the step of logging so as to track subscriber application use and demand.

* * * * *